United States Patent
Seagle et al.

(10) Patent No.: US 10,199,057 B1
(45) Date of Patent: Feb. 5, 2019

(54) INDEPENDENT SHUNTING OF DATA AND SERVO HEADS TO ALLOW A SINGLE SENSOR DEPOSITION ON TAPE WAFERS

(71) Applicant: Western Digital Technologies, Inc., San Jose, CA (US)

(72) Inventors: David J. Seagle, Morgan Hill, CA (US); Diane L. Brown, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/817,593

(22) Filed: Nov. 20, 2017

(51) Int. Cl.
 *G11B 5/187* (2006.01)
 *G11B 5/008* (2006.01)

(52) U.S. Cl.
 CPC .......... *G11B 5/187* (2013.01); *G11B 5/00813* (2013.01)

(58) Field of Classification Search
 None
 See application file for complete search history.

(56) References Cited

U.S. PATENT DOCUMENTS

| | | | |
|---|---|---|---|
| 6,341,416 B1 | 1/2002 | Biskeborn et al. | |
| 7,119,976 B2 | 10/2006 | Biskeborn et al. | |
| 7,450,340 B2 | 11/2008 | Lee et al. | |
| 7,567,409 B2 | 7/2009 | Lee et al. | |
| 8,333,898 B2 | 12/2012 | Brown et al. | |
| 8,472,148 B2 | 6/2013 | Brown et al. | |
| 8,804,287 B2 | 8/2014 | Araki et al. | |
| 9,653,098 B2 | 5/2017 | Torline | |
| 2006/0039082 A1* | 2/2006 | Biskeborn | G11B 5/4893 360/129 |
| 2008/0037182 A1* | 2/2008 | Albrecht | G11B 5/40 360/323 |
| 2009/0180216 A1* | 7/2009 | Golcher | G11B 5/11 360/323 |
| 2011/0261487 A1* | 10/2011 | Araki | B82Y 10/00 360/319 |
| 2016/0284372 A1* | 9/2016 | Duda | G11B 5/314 |

* cited by examiner

*Primary Examiner* — William J Klimowicz
(74) *Attorney, Agent, or Firm* — Patterson & Sheridan, LLP; Steven Versteeg

(57) ABSTRACT

Embodiments of the present disclosure generally relate to tape heads used for magnetic recording on tapes, and more specifically to tape heads including servo and data head structures. In one embodiment, a tape head includes two servo head structures and a plurality of data head structures. Each servo head structure includes a sensor, and each sensor is electrically coupled to two bonding pads. Each data head structure includes a sensor, and each sensor is electrically coupled to two bonding pads. A resistive shunt is disposed between the two bonding pads electrically coupled to the sensor of each data head structure. The resistive shunt decreases the electrical resistance of the sensor of the data head structure to a target resistance that is similar to the resistance of the sensor of the servo head structure.

25 Claims, 5 Drawing Sheets

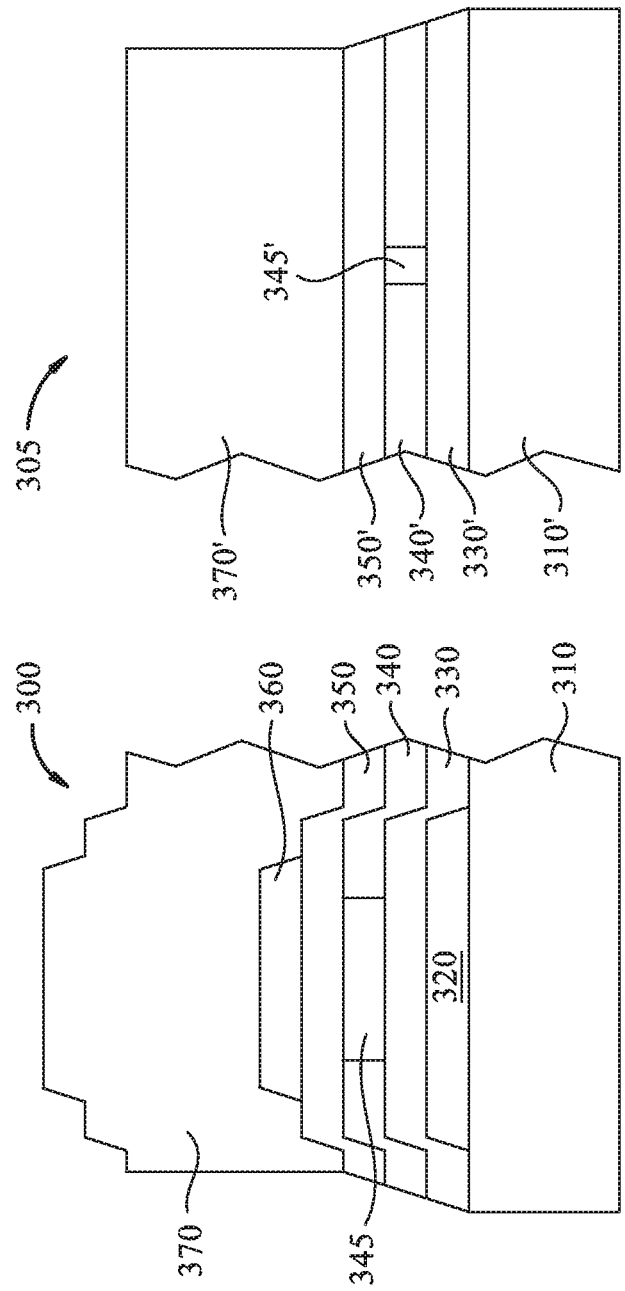

US 10,199,057 B1

INDEPENDENT SHUNTING OF DATA AND SERVO HEADS TO ALLOW A SINGLE SENSOR DEPOSITION ON TAPE WAFERS

BACKGROUND

Field of the Disclosure

Embodiments of the present disclosure generally relate to tape heads used for magnetic recording on tapes, and more specifically to tape heads including servo and data head structures.

Description of the Related Art

Tape heads are used to record and readback information on tapes by magnetic processes. The tape heads use servo heads to read servo tracks to align the heads for reading data stored on data tracks. The servo heads and data heads are typically formed using sensors disposed between two shield layers. Conventionally, the sensor for the servo head and the sensor for the data head have similar electrical resistance due to similar sizes (size is defined by the stripe height times the track width). However, current servo and data head designs do not provide adequate readback in newer tape designs that require higher data densities as well as different servo track and data track densities.

Therefore, it is desirable to provide head structures that allow for achieving higher recording area density than is currently available for tape heads.

SUMMARY OF THE DISCLOSURE

Embodiments of the present disclosure generally relate to tape heads used for magnetic recording on tapes, and more specifically to tape heads including servo and data head structures. In one embodiment, a tape head includes two servo head structures and a plurality of data head structures. Each servo head structure includes a sensor, and each sensor is electrically coupled to two bonding pads. Each data head structure includes a sensor, and each sensor is electrically coupled to two bonding pads. A resistive shunt is disposed between the two bonding pads electrically coupled to the sensor of each data head structure. The resistive shunt decreases the electrical resistance of the sensor of the data head structure to a target resistance that is similar to the resistance of the sensor of the servo head structure.

In one embodiment, a tape head includes a data head structure having a data head sensor, first and second bonding pads electrically coupled to the data head structure, and a resistive shunt electrically coupled to the first and second bonding pads, wherein the resistive shunt and the data head sensor are connected in parallel.

In another embodiment, a tape head includes a servo head structure having a servo head sensor having a first track width and a first stripe height. The tape head further includes a data head structure having a data head sensor having a second track width and a second stripe height, wherein the first track width is greater than the second track width, and the first stripe height is the same as the second stripe height. The tape head further includes first and second bonding pads electrically coupled to the data head structure and a resistive shunt disposed between the first and second bonding pads.

In another embodiment, a tape head includes two servo head structures, a plurality of data head structures disposed between the two servo head structures, wherein each data head structure of the plurality of data head structures includes a data head sensor. The tape head further includes a plurality of first bonding pads, wherein two bonding pads of the plurality of first bonding pads are electrically coupled to a corresponding data head sensor, and a plurality of resistive shunts, wherein each resistive shunt of the plurality of resistive shunts is electrically coupled to two bonding pads of the plurality of first bonding pads, wherein each resistive shunt and a corresponding data head sensor are connected in parallel.

In another embodiment, a tape head includes a servo head structure having a servo head sensor having a first track width and a first stripe height. The tape head further includes a data head structure having a data head sensor having a second track width and a second stripe height, wherein the first track width is greater than the second track width, and the first stripe height is the same as the second stripe height. The tape head further includes first and second bonding pads electrically coupled to the data head structure and means for reducing electrical resistance of the data head sensor, wherein the means is disposed between the first and second bonding pads.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 is a cross sectional media facing surface view of a servo head structure and a data head structure according to one embodiment disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present disclosure generally relate to tape heads used for magnetic recording on tapes, and more specifically to tape heads including servo and data head structures. In one embodiment, a tape head includes two servo head structures and a plurality of data head structures. Each servo head structure includes a sensor, and each sensor is electrically coupled to two bonding pads. Each data head structure includes a sensor, and each sensor is electrically coupled to two bonding pads. A resistive shunt is disposed between the two bonding pads electrically coupled to the sensor of each data head structure. The resistive shunt decreases the electrical resistance of the sensor of the data head structure to a target resistance that is similar to the resistance of the sensor of the servo head structure.

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. Additionally, the relative position of one layer with respect to other layers is provided assuming operations are performed relative to a substrate without consideration of the absolute orientation of the substrate.

Figure 1:
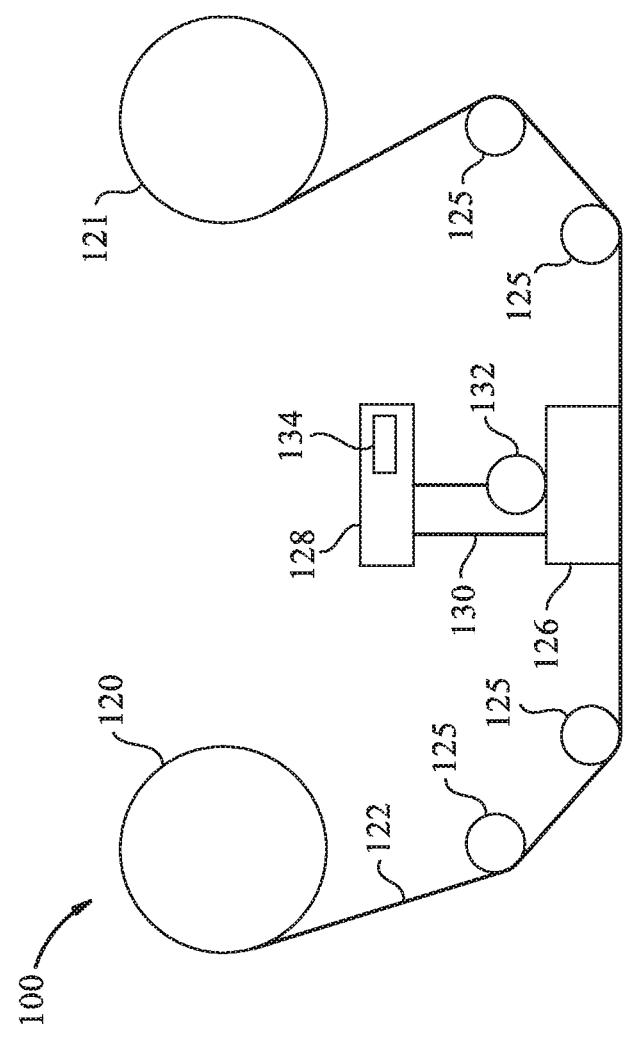
FIG. 1 is a schematic illustration of a tape drive according to one embodiment disclosed herein.

FIG. 1 is a schematic illustration of a tape drive 100 according to one embodiment disclosed herein. While one specific implementation of a tape drive is shown in FIG. 1, it should be noted that the embodiments describe herein may be implemented in the context of any type of tape drive system.

As shown, a tape supply cartridge 120 and a take-up reel 121 are provided to support a tape 122. One or more of the reels 121 may form a part of a removable cartridge and are not necessarily part of the tape drive 100. The tape drive, such as that illustrated in FIG. 1, may further include drive motor(s) (not shown) to drive the tape supply cartridge 120 and the take-up reel 121 to move the tape 122 over a tape head 126 of any type. Such head may include an array of data heads and servo heads (not shown in FIG. 1).

Guides 125 guide the tape 122 across the tape head 126 via a cable 130. The controller 128 typically controls head functions such as servo following, writing, reading, etc. The controller may operate under logic known in the art, as well as any logic disclosed herein. The cable 130 may include read/write circuits to transmit data to the head 126 to be recorded on the tape 122 and to receive data read by the head 126 from the tape 122. An actuator 132 controls the position of the head 126 relative to the tape 122.

An interface 134 may also be provided for communication between the tape drive and the host (integral or external) to send and receive the data and for controlling the operation of the tape drive and communicating the status of the tape drive to the host, as will be understood by those of skill in the art.

Figure 2:
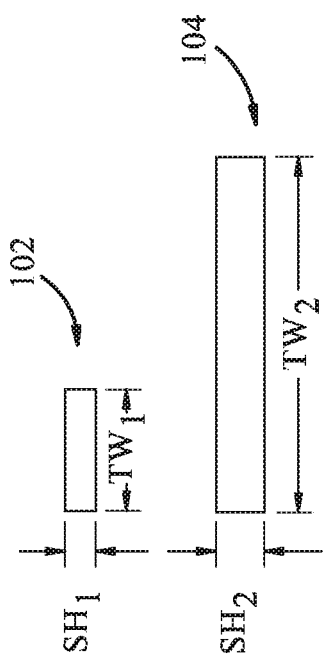
FIG. 2 is a schematic illustration of a sensor of a data head structure and a sensor of a servo head structure according to one embodiment disclosed herein.

FIG. 2 is a schematic illustration of a sensor 102 for a data head structure and a sensor 104 for a servo head structure according to one embodiment disclosed herein. The sensor 102 and the sensor 104 may be utilized in the tape head 126 shown in FIG. 1. The sensor 102 and the sensor 104 may be magnetoresistive sensors, such as tunnel junction magnetoresistive sensors, and each sensor 102, 104 may include a free layer structure, a pinner layer structure, and a non-magnetic electrically insulating barrier layer sandwiched therebetween. As shown in FIG. 2, the sensor 102 of the data head structure includes a stripe height $SH_1$ and a track width $TW_1$. The sensor 104 of the servo head structure includes a stripe height $SH_2$ and a track width $TW_2$. The size of the sensor for the servo head structure and the data head structure is defined by the stripe height of the sensor times the track width of the sensor. In other words, the size of the sensor for the servo head structure and the data head structure is the area of the sensor of the respective head structure. Conventionally, the size of the sensor of the servo head structure is similar to the size of the data head structure. For example, the sensor of the servo head structure may have a track width of about 2000 nm and a stripe height of about 600 nm, and the sensor of the data head structure may have a track width of about 1250 nm and a stripe height of about 400 nm. The size of the sensor of the conventional servo head structure is about 1.33 times the size of the sensor of the conventional data head structure.

The higher data density leads to reduced track width of the sensor 102 of the data head structure, while the track width of the sensor 104 of the servo head structure remains about the same in order to be backwards compatible. In one embodiment, the track width $TW_2$ of the sensor 104 of the servo head structure is about six times the track width $TW_1$ of the sensor 102 of the data head structure. Furthermore, the stripe height $SH_2$ of the sensor 104 of the servo head structure is the same as the stripe height $SH_1$ of the sensor 102 of the data head structure as the result of lapping process that laps both the sensor 104 of the servo head structure and the sensor 102 of the data head structure. As a result, the size of the sensor 104 of the servo head structure is about six times the size of the sensor 102 of the data head structure. Because the sensor 104 of the servo head structure and the sensor 102 of the data head structure are fabricated from the same material, the sensor 102 of the data head structure has about six times more resistance than the sensor 104 of the servo head structure. Because established tape readback electronics place a rigid requirement on yielding the resistance of data or servo head structures, a resistive shunt is patterned across each data head structure in order to reduce the resistance of the sensor of the data head structure to be close to or to match the resistance of the sensor of the servo head structure.

Figure 3:
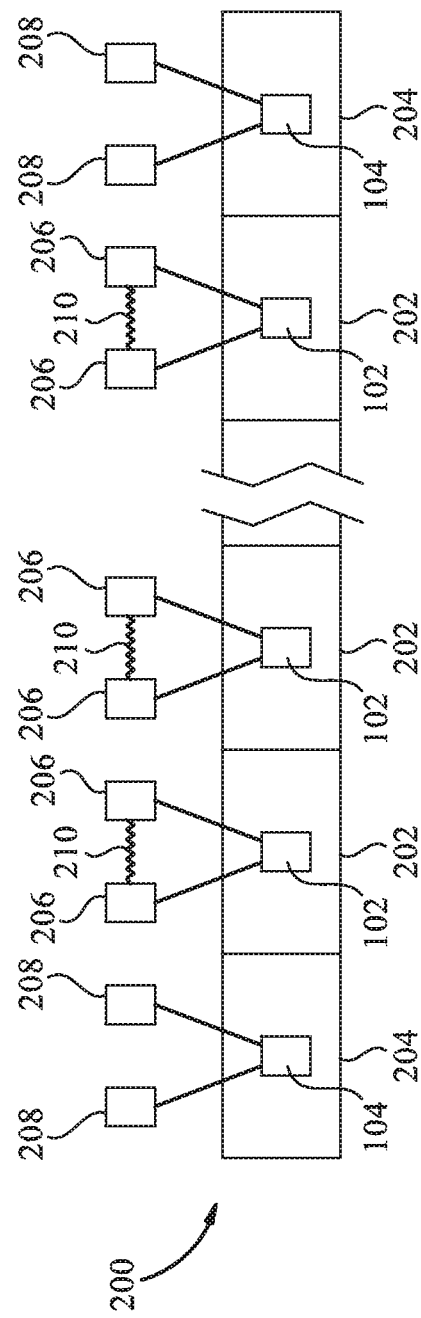
FIG. 3 is a schematic illustration of a tape head including two servo head structures and a plurality of data head structures according to one embodiment disclosed herein.

FIG. 3 is a schematic illustration of a tape head 200 including two servo head structures 204 and a plurality of data head structures 202 according to one embodiment disclosed herein. The tape head 200 may be the tape head 126 shown in FIG. 1. As shown in FIG. 3, the tape head 200 includes the plurality of data head structures 202 bounded by two servo head structures 204. In one embodiment, the plurality of data head structures 202 includes 33 data head structures 202. Each data head structure 202 includes the sensor 102, and each servo head structure 204 includes the sensor 104. Each sensor 104 of the servo head structure 204 is electrically coupled to two bonding pads 208, and each sensor 102 of the data head structure 202 is electrically coupled to two bonding pads 206. In one embodiment, there are four bonding pads 208 and 66 bonding pads 206. Because the sizes of the sensor 102 and sensor 104 are significantly different, the resistance of the sensor 102 of the data head structure 202 is significantly different from the resistance of the sensor 104 of the servo head structure 204. Thus, if the resistance of the sensor 104 of the servo head structure 204 is set to provide sufficient signal to noise ratio (SNR), the resistance of the sensor 102 of the data head structure 202 would be greater than the upper limit of the operation limits. In one embodiment, the operation limits are from about 40 Ohms to about 160 Ohms. In order to reduce the resistance of the sensor 102 of the data head structure 202 to a level close to or the same as the resistance of the sensor 104 of the servo head structure 204, a resistive shunt 210 is placed between the two bonding pads 206 that are electrically coupled to sensor 102 of each data head structure 202. In one embodiment, there are 33 resistive shunts 210. The resistive shunt 210 is electrically coupled to both bonding pads 206. The resistive shunt 210 and the corresponding sensor 102 are connected in parallel. The bonding pads 206, the resistive shunt 210, and the sensor 102 form a parallel circuit.

With the resistive shunt 210 electrically coupled to the bonding pads 206 that are electrically coupled to the data head structure 202, the resistance of the sensor 102 of the data head structure 202 is reduced. The resistive shunt 210 is fabricated from an electrically conductive material, such as iridium (Ir), ruthenium (Ru), chromium (Cr), nickel iron (NiFe), nickel chromium (NiCr), or any suitable material. The resistive shunt 210 has an electrical resistance that is about 1.5 times to five times the electrical resistance of the sensor 102 of the data head structure 202. There is no resistive shunt disposed between bonding pads 208 that are electrically coupled to the sensor 104 of the servo head structure 204.

The resistive shunt 210 may be formed before, during, or after the forming of the bonding pads 206. In one embodiment, the bonding pads 206 are first formed by first forming a blanket layer followed by patterning the blanket layer. The patterning may include forming a mask over one or more portions of the deposited blanket layer and milling or etching the portions of the material not covered by the mask. A gap is formed between the two bonding pads 206. The resistive shunt 210 is then formed in the gap between the two bonding pads 206. The resistive shunt 210 may be much thinner than the thickness of the bonding pads 206. Thus, a layer of dielectric material may be deposited between the bonding pads 206, and the resistive shunt 210 is deposited on the layer of dielectric material. Another layer of dielectric material may be deposited on the resistive shunt 210. In another embodiment, the resistive shunt 210 is first deposited and patterned, and the bonding pads 206 are deposited so the resistive shunt 210 is between the bonding pads 206. Again the resistive shunt 210 may be sandwiched between two layers of dielectric material. The blanket layer of the bonding pads 206 or the resistive shunt 210 may be deposited by any suitable deposition process, such as chemical vapor deposition (CVD) or physical vapor deposition (PVD) process. The patterning of the bonding pads 206 or the resistive shunt 210 may be performed by any suitable patterning process, such as reactive ion etching (RIE) or milling. The bonding pads 206 and the resistive shunt 210 may be fabricated from different materials or the same material. In one embodiment, the bonding pads 206 and the resistive shunt 210 are formed in the same process chamber, for example a PVD chamber.

FIG. 4 is a cross sectional media facing surface (MFS) view of a servo head structure 300 and a data head structure 305 according to one embodiment disclosed herein. As shown in FIG. 3, the servo head structure 300 and the data head structure 305 are formed on a substrate surface in a spaced apart relationship according to one embodiment. The servo head structure 300 and the data head structure 305 may be part of the tape head 126 shown in FIG. 1. It is to be understood that while only one servo head structure 300 and one data head structure 305 are shown, a tape head, such as the tape head 126 shown in FIG. 1, may have multiple servo head structures 300 and multiple data head structures 305. For example, an array of up to 33 data head structures 305 may be present and bounded by two servo head structures 300. Other combinations of data head structures 305 and servo head structures 300 are contemplated as well. The servo head structure 300 may be the servo head structure 204 shown in FIG. 3, and the data head structure 305 may be the data head structure 202 shown in FIG. 3.

As shown in FIG. 4, the servo head structure 300 includes a first shield layer 310, a first gap layer 320 disposed on the first shield layer 310, a second gap layer 330 disposed on the first gap layer 320 and any exposed portion of the first shield layer 310, a dielectric layer 340 disposed on the second gap layer 330 with a sensor 345 formed through the dielectric layer 340, a third gap layer 350 disposed on the dielectric layer 340 and the sensor 345, a fourth gap layer 360 disposed on the third gap layer 350, and a second shield layer 370 disposed on the fourth gap layer 360 and any exposed portions of the third gap layer 350.

The data head structure 305 is formed concurrently with the servo head structure 300 and includes several layers in common, which are marked with the related material layer deposition. For example, the first gap layer 330' of the data head structure 305 corresponds to the second gap layer 330 of the servo head structure 300.

The data head structure 305 includes a first shield layer 310', a first gap layer 330' conformally disposed on the first shield layer 310', a dielectric layer 340' disposed on the first gap layer 330' with a sensor 345' formed through the dielectric layer 340', a second gap layer 350' conformally disposed on the dielectric layer 340' and the sensor 345', and a second shield layer 370' disposed on the second gap layer 350'. As shown in FIG. 4, the sensor 345 of the servo head structure 300 has a greater track width than the sensor 345' of the data head structure 305.

The first and second shield layers 310, 310', 370, 370' are each formed by an electrodeposition process, such as electroplating or electroless deposition. The first and second shield layers 310, 310', 370, 370' each comprise a magnetic material selected from the group consisting of nickel iron alloy, cobalt iron alloy, cobalt nickel iron alloy, and combinations thereof. A nickel iron alloy of 80 atomic percent nickel and 20 atomic percent iron may be used as the first and second shield layer material. The first shield layer 310, 310' may be formed on or in a substrate surface material of alumina ($Al_2O_3$) or any other suitable material.

The gap layers 320, 330, 330', 350, 350', 360 each comprise a non-magnetic material selected from the group consisting of iridium, an alloy of nickel and chromium, tantalum, and combinations thereof. The gap layers 320, 330, 330', 350, 350', 360 may be deposited by a PVD or sputtering process and two or more of the deposition processes may be performed in the same chamber or same processing tool. After each layer is deposited, the layer may be patterned utilizing milling or photolithographic processing.

The gap layers 320, 330, 330', 350, 350', 360 may be each deposited at a thickness from about 40 nm to about 90 nm (nanometers), however, any thickness may be used based on the desired gap distances and sizes of the respective head structures for the tape heads. For example, the first gap layer 320 may comprise 80 nm of NiCr alloy, the second gap layer 330, 330' of 45 nm of NiCr alloy, the third gap layer 350, 350' of 45 nm NiCr alloy, and the fourth gap layer 360 may be deposited 80 nm of NiCr alloy.

The dielectric layer 340, 340' may also be deposited by a PVD or sputtering process and may be performed in the same chamber or same processing tool with the one or more gap layer deposition processes. The dielectric layer 340, 340' may comprise a suitable dielectric material, such as a dielectric material selected from the group of aluminum oxide, silicon oxide, silicon nitride, and combinations thereof.

The first and second shield layers 310, 310', 370, 370' may be spaced apart by the gap layers. The servo head structure 300 has a greater spacing between shield layers 310, 370 than the data head structure 305 in the embodiment of FIG. 4.

Figure 5A:
FIGS. 5A-5F illustrate a series of cross sectional views of the steps to form the servo head structure and the data head structure of FIG. 3 according to one embodiment disclosed herein.

FIGS. 5A-5F illustrate a series of cross sectional views of the steps to form the servo head structure 300 and the data head structure 305 of FIG. 4 according to one embodiment disclosed herein. FIG. 5A is a schematic cross section view of the servo head structure 300 and the data head structure 305. The first shield layers 310, 310' may each be deposited by an electrodeposition process, such as electroplating or electroless deposition. Once deposited, the first shield layers 310, 310' may be full film overcoated with a dielectric such as alumina and then chemical mechanical polished (CMP) for planarization and minimization of the surface roughness.

Figure 5B:

The first gap layer 320 is then formed on the shield layer 310 of the servo head structure 300 as shown in FIG. 5B. In the embodiment shown in FIG. 5B, the first gap layer 320 is not present on the shield layer 310' of the data head structure 305. In one embodiment, the first gap layer 320 may be formed by blanket depositing first gap layer 320 material over the both first shield layers 310, 310' and then patterning the deposited material. The patterning may comprise forming a mask over the deposited layer and the milling or etching the portions of the material not covered by the mask. The mask is then removed to leave the first gap layer 320 on the first shield layer 310 of the servo head structure 300.

In another embodiment, the first gap layer 320 may be formed by first depositing a photoresist layer and developing the photoresist layer to form a mask on the first shield layer 310'. Thereafter, the first gap layer 320 is deposited on the first shield layer 310. The mask is then removed leaving the first gap layer 320 formed over the servo head structure 300. During the formation of the first gap layer 320, the sidewalls may be tapered. The first gap layer 320 may be formed to be about 25 µm by about 30 µm (height by width) on a shield layer of about 38 µm by 60 µm.

Figure 5C:

The second gap layer 330 of the servo head structure 300 and the corresponding first gap layer 330' of the data head structure 305 are deposited on the first gap layer 320 and the exposed portion of the first shield layer 310 and the first shield layer 310' as shown in FIG. 5C. The second gap layer 330 and first gap layer 330' may each comprise a non-magnetic material selected from the group consisting of iridium, an alloy of nickel and chromium, tantalum, and combinations thereof. The material for the second gap layer 330 and first gap layer 330' is selected to minimize the surface roughness of the deposited layer so that the sensors 345, 345' may be deposited thereover. The second gap layer 330 and first gap layer 330' may be formed by blanket depositing the material over the first gap layer 320, exposed portions of the first shield layer 310, and the first shield layer 310'.

Figure 5D:
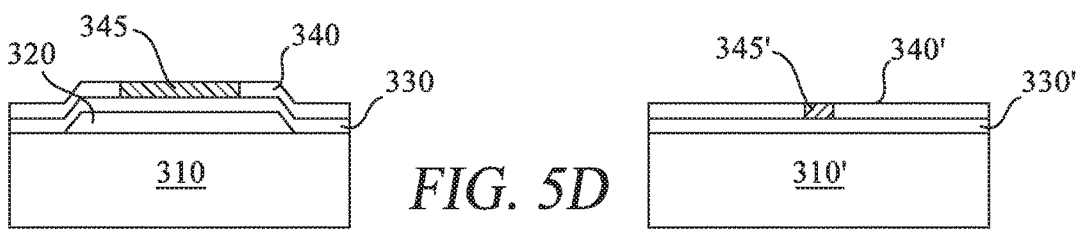

The dielectric layer 340 and sensor 345 of the servo head structure 300 and the corresponding dielectric layer 340' and sensor 345' of the data head structure 305, are then formed on the second gap layer 330 of the servo head structure 300 and the first gap layer 330' of the data head structure 305, respectively, as shown in FIG. 5D. The sensors 345 and 345' may be the same as the sensors 104, 102, respectively. The sensor 345 has a greater track width than the sensor 345'. In one embodiment, the sensors 345, 345' are formed by depositing multiple material layers and then etching back the layers, either individually or collectively, to form the final sensors 345, 345'. The dielectric layers 340, 340' are then formed by blanket depositing the dielectric material, forming a photoresist mask thereover, and removing the exposed dielectric material. The exposed dielectric material that is removed is formed over the sensors 345, 345'. Thus, after removal of the exposed dielectric material, the dielectric material will remain everywhere except over the sensors 345, 345'. The photoresist mask is then removed.

Figure 5E:
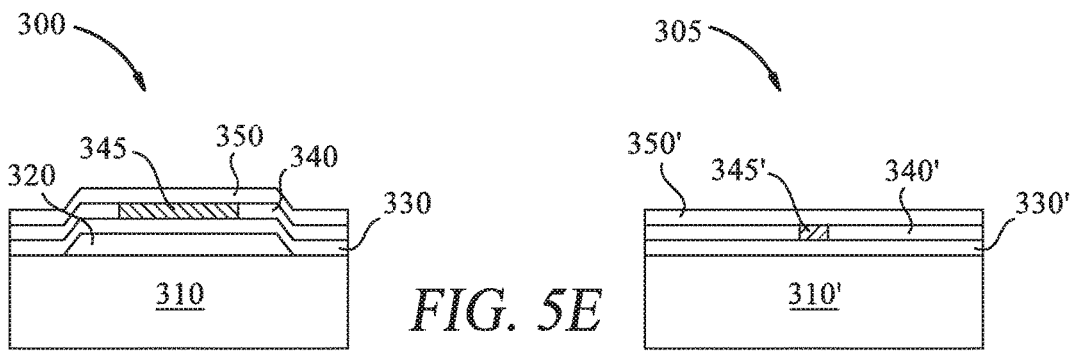

The third gap layer 350 of the servo head structure 300 and the corresponding second gap layer 350' of the data head structure 305 are deposited on the dielectric layer 340 and sensor 345 of the servo head structure 300 and corresponding dielectric layer 340' and sensor 345' of the data head structure 305, as shown in FIG. 5E. The third gap layer 350 and second gap layer 350' may each comprise a non-magnetic material selected from the group consisting of iridium, an alloy of nickel and chromium, tantalum, and combinations thereof. The third gap layer 350 and second gap layer 350' may be deposited by a PVD or sputtering process. The third gap layer 350 and second gap layer 350' may be deposited and then etched or milled back to the desired final shape.

Figure 5F:
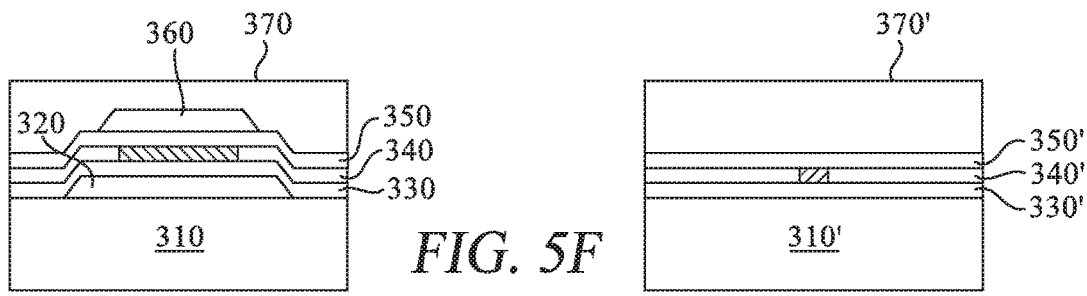

After the third gap layer 350 and second gap layer 350' are formed, the fourth gap layer 360 is deposited and patterned on the third gap layer 350 of the servo head structure 300 as shown in FIG. 5F. The fourth gap layer 360 may comprise a non-magnetic material selected from the group consisting of iridium, an alloy of nickel and chromium, tantalum, and combinations thereof. The material for the fourth gap layer 360 may comprise the same material as the third gap layer 350. The fourth gap layer 360 may be deposited by a PVD or sputtering process. The fourth gap layer 360 deposition process includes the deposition of the fourth gap layer 360 material followed by an etching process, such as an ion milling process using a lithographic patterning process, to remove some of the fourth gap layer 360 material forming tapered sides and exposing portions of the underlying third gap layer 350. The third gap layer 350 and the fourth gap layer 360 form a second spacer between the second shield 370 and the sensor 345.

The second shield layer 370 of the servo head structure 300 and the corresponding second shield layer 370' of the data head structure 305 are deposited on the third gap layer 350 and fourth gap layer 360 of the servo head structure 300 and the second gap layer 350' of the data head structure 305, as shown in FIG. 5F to form the structures as shown in FIG. 4.

A protective layer may be deposited over the two structures for completion of the device prior to forming the MFS. In one embodiment, the protective layer may comprise alumina. Vias may be etched through the alumina layer to permit electrical connection of the servo head structure 300 and data head structure 305 to bonding pads, such as bonding pads 208, 206, using high conductivity leads.

By electrically coupling the bonding pads with a resistive shunt, the electrical resistance of a smaller sensor that is electrically coupled to the bonding pads is reduced to a level that is close to or similar to the resistance of a larger sensor. The smaller sensor of the data head structure can read a tape having a higher data density, while the larger sensor of the servo head structure allows backward compatibility.

While the foregoing is directed to embodiments of the present disclosure, other and further embodiments of the disclosure may be devised without departing from the basic scope thereof, and the scope thereof is determined by the claims that follow.

The invention claimed is:

1. A tape head, comprising:
   a data head structure comprising a data head sensor;
   first and second bonding pads electrically coupled to the data head structure; and a resistive shunt electrically coupled to the first and second bonding pads, wherein the resistive shunt and the data head sensor are connected in parallel, wherein the resistive shunt is fabricated from a material selected from the group consisting of iridium, ruthenium, chromium, nickel iron, and nickel chromium.

2. The tape head of claim 1, wherein the data head sensor is disposed between two gap layers.

3. The tape head of claim 2, wherein the two gap layers are fabricated from a material selected from the group consisting of iridium, an alloy of nickel and chromium, tantalum, and combinations thereof.

4. The tape head of claim 2, wherein each of the two gap layers has a thickness ranging from about 40 nm to about 90 nm.

5. A tape drive comprising the tape head of claim 1.

6. A tape head, comprising:
a servo head structure, comprising:
a servo head sensor having a first track width and a first stripe height;
a data head structure, comprising:
a data head sensor having a second track width and a second stripe height, wherein the first track width is greater than the second track width, and the first stripe height is the same as the second stripe height;
first and second bonding pads electrically coupled to the data head structure; and
a resistive shunt disposed between the first and second bonding pads.

7. The tape head of claim 6, wherein the resistive shunt is fabricated from a material selected from the group consisting of iridium, ruthenium, chromium, nickel iron, and nickel chromium.

8. The tape head of claim 6, wherein the first track width is about six times the second track width.

9. The tape head of claim 6, wherein a size of the servo head sensor is greater than a size of the data head sensor.

10. The tape head of claim 9, wherein the size of the servo head sensor is about six times the size of the data head sensor.

11. The tape head of claim 6, wherein the resistive shunt and the data head sensor are connected in parallel.

12. A tape drive comprising the tape head of claim 6.

13. A tape head, comprising:
two servo head structures;
a plurality of data head structures disposed between the two head servo structures, wherein each data head structure of the plurality of data head structures comprises a data head sensor;
a plurality of first bonding pads, wherein two bonding pads of the plurality of first bonding pads are electrically coupled to a corresponding data head sensor; and
a plurality of resistive shunts, wherein each resistive shunt of the plurality of resistive shunts is electrically coupled to two bonding pads of the plurality of first bonding pads, wherein each resistive shunt and a corresponding data head sensor are connected in parallel, wherein each of the plurality of resistive shunts is fabricated from a material selected from the group consisting of iridium, ruthenium, chromium, nickel iron, and nickel chromium.

14. The tape head of claim 13, wherein the plurality of data head structures comprises 33 data head structures.

15. The tape head of claim 14, wherein the plurality of first bonding pads comprises 66 first bonding pads.

16. The tape head of claim 15, wherein the plurality of resistive shunts comprises 33 resistive shunts.

17. The tape head of claim 13, wherein each of the two servo head structures comprises a servo head sensor.

18. The tape head of claim 17, further comprising four second bonding pads, wherein two bonding pads of the second bonding pads are connected to a servo head structure of the two servo head structures.

19. A tape drive comprising the tape head of claim 13.

20. A tape head, comprising:
a servo head structure, comprising:
a servo head sensor having a first track width and a first stripe height;
a data head structure, comprising:
a data head sensor having a second track width and a second stripe height, wherein the first track width is greater than the second track width, and the first stripe height is the same as the second stripe height; and
a first and second bonding pads electrically coupled to the data head structure; and
means for reducing electrical resistance of the data head sensor, wherein the means is disposed between the first and second bonding pads.

21. The tape head of claim 20, wherein the first track width is about six times the second track width.

22. The tape head of claim 20, wherein a size of the servo head sensor is greater than a size of the data head sensor.

23. The tape head of claim 22, wherein the size of the servo head sensor is about six times the size of the data head sensor.

24. The tape head of claim 20, wherein the means for reducing electrical resistance of the data head sensor and the data head sensor are connected in parallel.

25. A tape drive comprising the tape head of claim 20.

* * * * *